US011565915B2

(12) United States Patent
Brendel

(10) Patent No.: US 11,565,915 B2
(45) Date of Patent: Jan. 31, 2023

(54) WIRELESS REMOTE CONTROL FOR THE WIRELESS REMOTE CONTROL OF A MACHINE, IN PARTICULAR A CRANE

(71) Applicant: Brendel Holding GmbH & Co. KG, Crailsheim (DE)

(72) Inventor: Wolfgang Brendel, Crailsheim (DE)

(73) Assignee: Brendel Holding GmbH & Co. KG, Crailsheim (DE)

( * ) Notice: Subject to any disclaimer, the term of this patent is extended or adjusted under 35 U.S.C. 154(b) by 357 days.

(21) Appl. No.: 16/649,406

(22) PCT Filed: Sep. 19, 2018

(86) PCT No.: PCT/EP2018/075329
§ 371 (c)(1),
(2) Date: Mar. 20, 2020

(87) PCT Pub. No.: WO2019/057759
PCT Pub. Date: Mar. 28, 2019

(65) Prior Publication Data
US 2020/0299110 A1 Sep. 24, 2020

(30) Foreign Application Priority Data
Sep. 20, 2017 (DE) ...................... 10 2017 105 701.1

(51) Int. Cl.
*B66C 13/44* (2006.01)
*H04W 4/40* (2018.01)
(Continued)

(52) U.S. Cl.
CPC .............. *B66C 13/44* (2013.01); *G06F 3/038* (2013.01); *G06F 3/0488* (2013.01); *G08C 17/02* (2013.01);
(Continued)

(58) Field of Classification Search
CPC ....... G06F 3/038; G06F 3/0488; B66C 13/44; G08C 17/02; G08C 2201/32; H04W 4/40
See application file for complete search history.

(56) References Cited

U.S. PATENT DOCUMENTS 6,285,925 B1 9/2001 Steffen
10,040,672 B2 * 8/2018 Haug .................. H01H 9/0214
(Continued)

FOREIGN PATENT DOCUMENTS

GB 2534471 A 7/2016
WO 2010132249 A1 11/2010

OTHER PUBLICATIONS

"DJI Mavic and Spark Tablet Adapter", Dirty J Designs, Available online at https://www.youtube.com/watch?v=LqOTPdTZ9ns, Nov. 1, 2016, 1 page.
(Continued)

*Primary Examiner* — Vernal U Brown
(74) *Attorney, Agent, or Firm* — Kilpatrick Townsend & Stockton LLP

(57) ABSTRACT

A compact wireless remote control for the wireless remote control of a machine is described, having an upper-face operating surface having a display device and at least one free space which is below the upper-face operating surface so as to be at least partly covered by same, is open towards the outside at least laterally on one side, and is delimited by wall portions of the wireless remote control. At least one operating element which can be actuated by an operator at least from the open lateral side of the free space is provided on at least one of said wall portions on the free space side. The free space is preferably formed continuously from one lateral side to the other lateral side and is open at both lateral sides. At least one operating element in each case can be manually accessed from each open lateral side for actuation.

10 Claims, 1 Drawing Sheet

(51) Int. Cl.
    *G06F 3/038*      (2013.01)
    *G06F 3/0488*     (2022.01)
    *G08C 17/02*      (2006.01)
(52) U.S. Cl.
    CPC ......... *H04W 4/40* (2018.02); *B66C 2700/088* (2013.01); *G08C 2201/32* (2013.01)

(56) References Cited

U.S. PATENT DOCUMENTS

| | | | | |
|---|---|---|---|---|
| 2012/0050059 | A1* | 3/2012 | Klicpera | G08B 13/1427 |
| | | | | 235/472.01 |
| 2015/0091697 | A1* | 4/2015 | Takayasu | G08C 17/02 |
| | | | | 340/5.64 |
| 2018/0141751 | A1* | 5/2018 | Muranaka | G05D 1/0016 |

OTHER PUBLICATIONS

International Application No. PCT/EP2018/075329, "International Search Report and Written Opinion", dated Dec. 20, 2018, 9 pages.

* cited by examiner

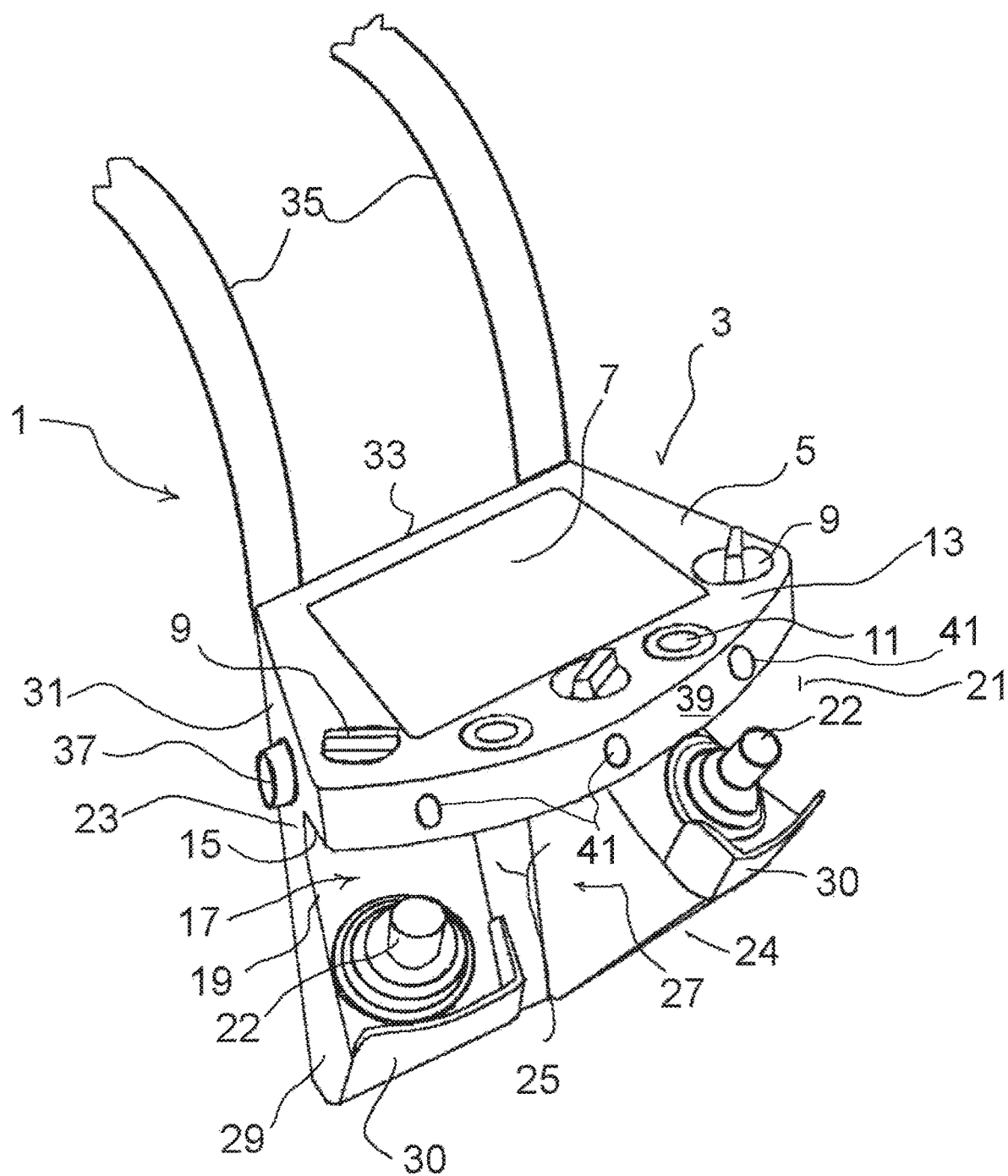

WIRELESS REMOTE CONTROL FOR THE WIRELESS REMOTE CONTROL OF A MACHINE, IN PARTICULAR A CRANE

CROSS REFERENCE TO RELATED APPLICATION

This application claims priority to German Patent Application No. 10 2017 105 701.1, filed in Germany on Sep. 20, 2017, the entire contents of which are hereby incorporated herein by this reference.

The present invention relates to a wireless remote control for the wireless remote control of a machine, in particular a crane.

The term "wireless remote control" is used in the present application to refer to an operating device to be carried by an operator, from which control commands can be sent to the machine to be wirelessly remote-controlled and which is part of a wireless remote control system which comprises a machine-side wireless receiver.

Known wireless remote controls for controlling complex machines, such as construction cranes having a plurality of degrees of freedom of movement to be controlled, usually have a large number of operating elements on an operating surface, such as joysticks, rotary switches, toggle switches, pressure switches, range controllers, etc., as well as displays and/or other display means, for example for displaying the machine's status information.

In order to accommodate all of these operating elements and display means in a user-friendly manner, relatively large housings having a large-surface-area operating surface for the wireless remote controls have been used so far, and therefore the devices were unwieldy.

The present invention has the object of providing a user-friendly wireless remote control which is suitable for controlling complex machines, such as crane systems, tunnel boring machines and the like and which, accordingly, can have a large number of operating elements and optional display elements, and is still compact.

To achieve this object, a wireless remote control according to claim 1 is proposed, specifically a wireless remote control for the wireless remote control of a machine, comprising an upper-face operating surface having a display device and at least one free space which is below the upper-face operating surface so as to be at least partly covered by same, is open towards the outside at least laterally, and is delimited by wall portions of the wireless remote control, wherein at least one operating element which can be actuated by an operator at least from the open lateral side of the free space is provided on at least one of said wall portions on the free space side.

The basic concept of the invention is to provide, in addition to the upper-face operating surface, at least one further operating panel which, from the point of view of an operator holding the wireless remote control as intended, is ergonomically accessible for the operator in order to actuate operating elements on the further operating panel, despite being at least partly covered by the upper-face operating surface. At least one operating element is provided on said operating panel which the operator can operate as intended intuitively and without necessary visual contact. To do this, the operator can manually grasp the operating element from the open side of the free space. The operating element can be, for example, a joystick, a switch, a range controller or the like.

A plurality of operating elements are preferably provided in the free space. This is particularly advantageous if, according to a preferred development of the invention, the free space is formed continuously from one lateral side to the other lateral side of the wireless remote control—or, optionally, is divided between the lateral sides and the free space is open at both lateral sides of the wireless remote control, such that at least one operating element in each case can be manually accessed by an operator holding the wireless remote control as intended from each of the two open lateral sides in order to be actuated.

In particular, joystick operating elements are a possibility for operating elements to be actuated intuitively in the free space. For example, these can also be Z-axis joysticks which can be rotated about their longitudinal axis.

The free space is preferably open not only at the lateral sides, but at least also at the transition from the relevant lateral side to the front side of the wireless remote control. According to a particularly expedient embodiment, the free space is continuously open at the front side, such that access to the additional operating panel is possible from the side and from the front, which means greater operational comfort. In such an embodiment of the wireless remote control, the front edge of the further operating panel, in plan view, can also protrude forwards slightly beyond the upper-face operating surface. This offers the possibility of accommodating operating elements in the front region of the further operating panel which are at least partly visible to an operator holding the wireless remote control as intended, for example toggle switches, linear levers, etc.

Furthermore, it is proposed that the free space is delimited on the rear side by a rear wall of the wireless remote control which extends downwards from the upper-face operating surface and forms a rear-side outer support surface which is designed to be supported on the abdomen and/or chest area of the operator when the wireless remote control is used as intended.

According to one embodiment of the invention, an emergency stop switch is provided on at least one lateral outer side of the wireless remote control.

When the wireless remote control is held as intended during operation, the emergency stop switch is always close to the operator's palm. The operator can thus react quickly to an emergency situation by actuating the emergency stop switch.

Instead of the emergency stop switch, or as such, or in addition thereto, a so-called enable switch can preferably be provided on at least one lateral outer side of the wireless remote control. An embodiment of the wireless remote control of this type can be kept in the active state only by permanently actuating the enable switch. If the operator releases the enable switch, the wireless remote control switches to an inactive state in which said remote control does not issue any further relevant wireless remote control commands, optionally with the exception of a possible emergency stop command. The wireless remote control can resume normal control operation only after the enable switch has been actuated again. The enable switch is preferably also attached such that the operator can hold said switch down using the palm of his hand or forearm while actuating operating elements.

The enable switch can be designed, for example, as a three-state enable switch, by means of which three switching states can be implemented, specifically:
1. the passive state in which the switch is not actuated,
2. the normal active state when the three-state enable switch is actuated normally, 3. the actively triggered emergency stop state when the three-state enable switch is actuated (pressed) beyond the normal active state.

An emergency stop can thus be triggered by releasing or rapid excess pressing of the three-state enable switch.

A further preferred security feature is at least one preferably capacitive dead man's sensor in the wireless remote control, this dead man's sensor being intended and designed to monitor the presence of an operator's hand on a relevant operating element and to switch said operating element to inactive when the hand is removed therefrom.

The wireless remote control preferably has at least one near-field distance sensor, which can be a distance monitoring sensor of a type known per se and which triggers an emergency stop control signal in the wireless remote control for the controlled machine when the wireless remote control and thus the operator moves too close to moving parts of the controlled machine, i.e. the distance falls below a minimum distance from the machine. The near-field distance sensor can function, for example, on an ultrasound or radar basis According to a development of the invention, the display device comprises a touch display, by means of which data can also be entered.

It is further proposed that the wireless remote control is equipped with wireless receiving means, by means of which said remote control can receive status information regarding the machine to be controlled.

An embodiment of the invention is explained in more detail below with reference to FIG. 1.

FIG. 1 is a perspective view of a wireless remote control 1 according to the invention.

The wireless remote control 1 has a housing 3 having an upper-face operating surface 5, on which a relatively large display 7 is arranged. Operating elements, such as rotary switches 9 and pushbutton switches 11, are also provided on the upper-face operating surface 5. Other and further operating elements can also be positioned on the upper-face operating surface 5.

The upper-face operating surface 5 is the upper face of a part 13 of the housing 3 which projects forwards at the top. Said part 13 delimits, with the lower face 15 thereof, the upper region of a free space 17 which is formed continuously from one lateral side 19 to the other lateral side 21 of the wireless remote control 1 and is open at both lateral sides 19, 21 and at the front side 24 of the wireless remote control 1.

The free space 17 is also delimited on the rear side and lower side by wall portions 23, 25 of the housing 3 and forms a further operating panel 27 on the lower side thereof, on which two Z-axis joysticks 22, 22 are arranged laterally on the outside as operating elements in this example, such that they can be easily grasped from the side through the free space 17 open at the lateral sides. On the front side 24 of the wireless remote control, two hand guard screens 30 are provided in front of the operating elements 22, 22.

The lower part 29 of the housing 3, which has the further operating panel 27, is connected to the upper housing part 13 by a rear wall part 31. Said rear wall part 31 forms a rear-side outer support surface 33 which can have a curve, for example, and is designed to be supported on the abdomen and/or chest area of the operator when the wireless remote control 1 is used as intended. Carrier belts which the operator can stretch over the shoulders are shown in portions and designated by 35 in FIG. 1.

On the side 19, the wireless remote control 1 has an emergency stop switch 37 which can be reached very quickly by a hand of the operator when the wireless remote control 1 is used as intended.

Such an emergency stop switch 37 can, for example, also be provided at a corresponding position on the lateral side which is opposite the side 19.

According to an embodiment of the wireless remote control 1, the emergency stop switch 37 can be designed as a so-called enable switch 37. In order to keep the wireless remote control 1 in its active state, the operator has to keep the enable switch 37 actuated, i.e. to keep it pressed using the palm of the hand while actuating the operating elements, for example.

If the operator releases the enable switch 37, the wireless remote control 1 switches to an inactive state in which said remote control does not issue any further relevant wireless remote control commands, optionally with the exception of a possible emergency stop command. The wireless remote control 1 can resume normal control operation only after the enable switch 37 has been actuated again.

The enable switch 37 can be designed, for example, as a three-state enable switch, by means of which three switching states can be implemented, specifically:

1. the passive state in which the switch 37 is not actuated,
2. the normal active state when the three-state enable switch 37 is actuated normally,
3. the actively triggered emergency stop state when the three-state enable switch 37 is actuated (pressed) beyond the normal active state.

An emergency stop of the machine to be controlled can thus be triggered by releasing and excess pressing of the three-state enable switch.

It should also not be excluded within the scope of the invention that, in addition to an enable switch, an emergency stop switch is provided on the housing 3, for example in the front region thereof at the top between the joysticks 22.

The upper housing part 13 is arc-shaped on its front side 39, where said part has a plurality of near-field distance sensors 41 which are distance monitoring sensors that trigger an emergency stop control signal in the wireless remote control 1 for the controlled machine when the wireless remote control 1 and thus the operator moves too close to moving parts of the controlled machine, i.e. the distance falls below a minimum distance from the machine.

The invention claimed is:

1. Wireless remote control for wirelessly remote controlling a machine, comprising:
   an upper-face operating surface having a display device and operating elements; and
   at least one free space which is below the upper-face operating surface so as to be at least partly covered by same, is open towards the outside at least laterally on one side, is delimited by wall portions on an upper side, a lower side and a rear side of the wireless remote control, and forms a further operating panel on the lower side,
   wherein at least one operating element which can be actuated by an operator at least from the one side of the at least one free space is provided on at least one of the wall portions,
   wherein the further operating panel comprises the at least one operating element, and
   wherein the at least one operating element is disposed on a lower wall portion of the wall portions, the lower wall portion delimiting the at least one free space on the lower side.

2. Wireless remote control according to claim 1, wherein the at least one free space is formed continuously from one lateral side to another lateral side of the wireless remote control, or is divided between the lateral sides and is open at both lateral sides of the wireless remote control, wherein the at least one operating element in each case can be manually accessed from each open lateral side in order to be actuated.

3. Wireless remote control according to claim 1, wherein the at least one operating element is a joystick operating element.

4. Wireless remote control according to claim 1, wherein the at least one free space is also open at a transition from a lateral side to a front side of the wireless remote control.

5. Wireless remote control according to claim 1, wherein the at least one free space is delimited on the rear side by a rear wall of the wireless remote control which extends downwards from the upper-face operating surface and forms a rear outer support surface which is designed to be supported on the abdomen and/or chest area of the operator when the wireless remote control is used as intended.

6. Wireless remote control according to claim 1, wherein an emergency stop pressure switch and/or an enable switch, in particular a three-state enable switch, is provided on at least one lateral outer side of the wireless remote control.

7. Wireless remote control according to claim 1, wherein the wireless remote control has at least one, in particular capacitive, dead man's sensor which is designed to monitor the presence of an operator's hand on an operating element and to switch the operating element to inactive when the hand is removed from the operating element.

8. Wireless remote control according to claim 1, wherein the display device comprises a touch display via which data can be input.

9. Wireless remote control according to claim 1, wherein the wireless remote control has wireless receiving means.

10. Wireless remote control according to claim 1, wherein the wireless remote control has at least one near-field distance sensor which triggers an emergency stop signal when the wireless remote control approaches the machine to be controlled in such a way that a distance between the wireless remote control and the machine falls below a minimum distance.

* * * * *